:::
United States Patent Office 3,792,015
Patented Feb. 12, 1974

---

3,792,015
PROCESS FOR PREPARING POLYESTER AND COPOLYESTER RESINS
James E. Duddey, Akron, Maneung Hahn, Tallmadge, and Joseph P. Schirmer, Jr., Akron, Ohio, assignors to The Goodyear Tire & Rubber Company, Akron, Ohio
No Drawing. Filed June 19, 1972, Ser. No. 263,833
Int. Cl. C08g 51/58
U.S. Cl. 260—45.95 H                     8 Claims

ABSTRACT OF THE DISCLOSURE

Linear polyester and copolyester resins having improved dyeability are prepared by reacting a free dicarboxylic acid and a glycol in the presence of a stabilizing composition and a metallic salt of isethionic acid and polycondensing the esterification product to form high molecular weight resin.

---

This invention relates to the preparation of highly polymeric linear polyester and copolyester resins having improved cationic dye receptivity and to products prepared from the polyester resins.

It is known that cationic dyeability can be imparted to polyester resin by chemically incorporating sulfonate groups in the polyester chain. In the past aliphatic sulfonates having at least three carbon atoms in the aliphatic radical attached to the sulfonate group have been employed with good success. It was believed that aliphatic radicals of at least three carbon atoms in length were necessary since sulfonates containing aliphatic groups with less than three carbon atoms were believed to lack the necessary thermal stability required in a polyester resin forming process. For example, it was observed that under the reaction conditions of a direct esterification-polycondensation process employing alkali metal salts of isethionic acid, pigmented (black) particles were produced which imparted undesirable color to the polyester resin. It was also observed that in addition to producing polyester resins having undesirable color, yarns produced from polyester resins modified with metallic salts of isethionic acid exhibited excessive filamentation and breakage.

A process has now been found for preparing cationic dyeable high molecular weight polyester resins which overcomes the drawbacks discussed above. In its broadest scope the invention comprises a process consisting of the steps of (A) carrying out an esterification reaction on a mixture comprising (1) at least one free dicarboxylic acid, (2) at least one glycol, (3) a stabilizing composition consisting of (a) at least one compound selected from the group consisting of alkali metal compounds and tertiary amines and (b) at least one compound selected from the group consisting of hindered phenols and (4) a metallic salt of isethionic acid having the formula $HOCH_2CH_2SO_3M$, where M is an alkali or alkaline earth metal and (B) condensing the product of the esterification reaction to yield cationic dyeable high molecular weight linear polyester resin. In a more narrow aspect the invention comprises the above described process wherein the esterification reaction of step (A) is carried out in a solvent consisting of low molecular weight linear polyester resin having a degree of polymerization ranging from about 3 to about 20. Cationic dyeable, high molecular weight linear polyesters prepared in accordance with the above described process are free of the pigmented particles previously observed in prior art processes to which metal salts of isethionic acid had been added and further exhibit good physical properties and processing characteristics. The term "polyester resin" as employed throughout this disclosure includes both homopolyester and copolyester resins.

The following examples, in which parts and percentages are by weight unless otherwise indicated, illustrate the invention. The intrinsic viscosities were determined on 0.1 gram samples of polymer in 60/40 phenol/tetrachloroethane solution at 30° C.

EXAMPLE 1

To an esterification reaction vessel were added 598 grams (gms.) (3.6 mols) of terephthalic acid, 291 gms. (4.7 mols) of ethylene glycol, 0.76 gm. of Irganox 1010, 0.271 gm. of sodium acetate and 8.74 gms. of sodium isethionate. The reaction vessel was then pressurized to 40 pounds per square inch gauge (p.s.i.g.) with nitrogen gas and heated at a temperature ranging from about 250° to 255° C. with continuous removal of water. At the end of 4.5 hours the esterification reaction was complete. Fifty grams of the esterification product were then transferred to a second reaction vessel to which was then added 0.015 gm. of antimony dioxide. The esterification product was then polymerized at a temperature of about 275° C. and a pressure below 1.0 millimeter of mercury with removal of glycol. A clear, particle free polyethylene terephthalate resin was obtained after about three hours.

EXAMPLE 2

Cationic dyeable, high molecular weight polyethylene terephthalate was prepared by charging to a five gallon reactor, 10.4 pounds (lbs.) of terephthalic acid, 5.15 lbs. of ethylene glycol, 3.26 gms. of pentaerythritol, 1.92 milliliters (ml.) of trisethylene diphosphite, 27.2 gms. of sodium 5-sulfoisophthalic acid, 5.45 gms. of Irganox 1010, 1.94 gms. of anhydrous sodium acetate and 63.0 gms. of sodium isethionate. The reactor was then pressurized with nitrogen to a pressure of 35 p.s.i.g. The reactants were then heated to a temperature in the range of from 240° C. to 250° C. Water formed was distilled from the reaction system. The reaction was continued for a period of approximately six hours, at which point the reaction product was a low molecular weight polymer having an average degree of polymerization (D.P.) of about 5. To this low molecular weight polymer was then added an additional 8.65 lbs. of terephthalic acid, 4.28 lbs. of ethylene glycol, 2.72 gms. of pentaerythritol, 1.6 ml. of trisethylene diphosphite, 22.6 gms. of sodium 5-sulfoisophthalic acid, 4.54 gms. of Irganox 1010, 1.26 gms. of anhydrous sodium acetate and 52.5 gms. of sodium isethionate. The resulting mixture was then reacted at a pressure of 35 p.s.i.g. at a temperature in the range of 240° to 250° C. The reaction was continued under these conditions for approximately 3.5 hours, at which point 10 lbs. of the reaction product was transferred to a two gallon reactor. To the reaction product in the two gallon reactor were added 181 gms. of Polymeg 1000 (polytetramethylene glycol having a molecular weight of 1000) and 1.14 gms. of antimony trioxide. This mixture was then condensed at a temperature of 275° C. and a pressure of 0.2 to 1.0 millimeter of mercury with removal of glycol. The condensation was continued until the polyester formed had attained the desired intrinsic viscosity. The polyester resin was free of any pigmented particles and had an intrinsic viscosity of 0.589 deciliters per gram (dl./g.) and a melting point of 227° C. This polyester resin was processed into a fiber of 139 denier, tenacity of 3.06 grams/denier and elongation at break of 33.7 percent. On dyeing with 2 percent Basic Red 18 the product exhibited a deep red shade with good ultraviolet lightfastness.

COMPARATIVE EXAMPLE

The procedure of Example 1 was carried out with the exception that sodium acetate was omitted from the formulation. High molecular weight product could not be obtained due to the general decomposition of the polyester system.

COMPARATIVE EXAMPLE

The procedure of Example 1 was carried out with the exception that the Irganox 1010 was omitted from the formulation. The final product contained large quantities of pigmented particles which made this product unsuitable for subsequent processing to fiber.

EXAMPLE 3

A cationic dyeable, high molecular weight polyethylene terephthalate was prepared in much the same manner as in Example 2 with the exception that the sodium acetate was replaced with diethanol-t-butylamine. The particulars of the preparation are set forth below. To a five gallon reactor were charged 10.4 pounds (lbs.) of terephthalic acid, 5.15 lbs. of ethylene glycol, 3.26 grams (gms.) of pentaerythritol, 1.95 ml. of trisethylene diphosphite and 5.45 gms. of Irganox 1010. The reactor was then pressurized with nitrogen to a pressure of 35 p.s.i.g. The mixture was then heated at a temperature of from 230° to 250° C. for approximately five hours with the continuous removal of water. To the molten low molecular weight polyester resin product were then added 10.56 gms. of diethanol-t-butylamine followed by the addition of 8.65 lbs. of terephthalic acid, 2.72 gms. of pentaerythritol, 4.54 gms. of Irganox 1010, 1.6 ml. of trisethylene diphosphite, 115.5 gms. of sodium isethionate, 49.7 gms. of sodium 5-sulfoisophthalic acid and 4.28 lbs. of ethylene glycol. This mixture was then reacted at 35 p.s.i.g. pressure and a temperature ranging from 246° to 250° C. The reaction was continued for about 3.5 hours. At the end of the time about 10 pounds of the reaction product were transferred to a second reactor. To this second reactor was also added 1.14 gms. of antimony trioxide and 181 gms. of polytetramethylene glycol having a molecular weight of 1000. This mixture was then condensed at a temperature ranging from 250° to 275° C. and a pressure of from 1.0 to 0.2 millimeter of mercury with the removal of glycol. The condensation reaction was continued until the polyester formed had obtained the desired intrinsic viscosity. The polyester resin was free of any pigmented particles and had an intrinsic viscosity of 0.604 dl./g. and a melting point of 233.3° C. This polyester resin was processed into a fiber having a denier of 139, a tenacity of 3.2 grams/denier and an elongation at break of 33 percent. On dyeing with a 2 percent Basic Red 18 the product exhibited a deep red shade with good ultraviolet lightfastness.

The invention is illustrated above particularly with respect to the use of terephthalic acid and ethylene glycol to prepare polyethylene terephthalate. The invention is also useful in the preparation of various other cationically dyeable polyesters prepared from various other dicarboxylic acids and glycols.

Representative examples of other dicarboxylic acids such as isophthalic acid; orthophthalic acid, phenylindane dicarboxylic acid; 2,6-naphthalene dicarboxylic acid; 2,5-naphthalene dicarboxylic acid and the like; the cycloaliphatic dicarboxylic acids such as tetrahydroterephthalic acid and the like and the aliphatic dicarboxylic acids such as glutaric acid, adipic acid, azelaic acid, sebacic acid, dimer acid, dodecanedicarboxylic acid and the like and mixtures thereof.

Representative examples of other glycols include the polymethylene glycols having from 2 to 10 methylene groups such as ethylene glycol, propylene glycol, tetramethylene glycol, neopentylene glycol, hexamethylene glycol and decamethylene glycol; the cyclohexane diols, cyclohexane dimethanol, di-β-hydroxyethoxy benzene and 2,2-bis[4-(β-hydroxyethoxy)phenyl] propane and similar varieties of glycols. Mixtures of these various glycols can also be employed.

The alkali metal compounds useful as the (a) component of the stabilizing compositions employed in step (A) of the process of this invention include both inorganic and organic alkali metal compounds, such as alkali metal hydroxides, phosphates, alkoxides, carboxylates and the like. Representative examples of inorganic and organic alkali metal compounds include sodium hydroxide, potassium hydroxide, disodium hydrogen phosphate, potassium methoxide, sodium ethoxide, sodium acetate, sodium p-hydroxy benzoate and the like. The tertiary amines useful as the (a) component of the stabilizing compositions employed in step (A) of the process of this invention include those corresponding to the formula $R_1R_2R_3N$, where $R_1$, $R_2$ and $R_3$ are selected from a group consisting of alkyl, hydroxyalkyl, cycloalkyl and aryl radicals and wherein $R_1$, $R_2$ and $R_3$ may or may not be the same. Representative examples of tertiary amines corresponding to the above formula and useful as the (a) component of the stabilizing composition include ethyldicyclohexylamine, diethanol-t-butylamine, cyclohexyldiethanolamine and the like. The invention has been illustrated above particularly with respect to the use of sodium acetate and diethanol-t-butylamine as the (a) component of the stabilizer compositions.

The second, or (b) component, of the stabilizing compositions employed in the process of this invention are selected from the group consisting of hindered phenols. The hindered phenols and hindered phenolic phosphite compounds useful as the (b) component of the stabilizing composition include only those compounds that, under the operating conditions of the polyester forming process, exhibit good thermal stability and low volatility. In other words, the compounds selected for component (b) must be thermally stable to a temperature of about 250° C., and preferably up to 300° C., and nonvolatile at pressures of 1.0 millimeter of mercury or less, for them to be useful. Representative examples of hindered phenols having good thermal stability and low volatility include Irganox 1010 sold by Geigy Chemical Industries and having the formula

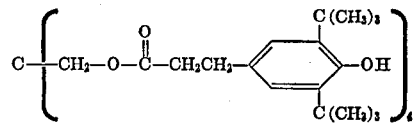

2,6-di-t-butyl-4-methylphenol; 2,4,6-tri-t-butylphenol; 2,6-di-t-butylphenol; 1,3,5-trimethyl-2,4,6-tris-(3,5-di-t-butyl-4-hydroxybenzyl) benzene and the like. The invention has been illustrated above particularly with respect to the use of Irganox 1010 as the (b) component of the stabilizer compositions.

The amounts of component (a) and component (b) which comprise the stabilizing composition of this invention can be varied. Generally the amount of the compound comprising component (a) that can be employed ranges from about 0.001 equivalent of base to about 0.013 equivalent of base per thousand parts of polyester resin formed. In practice it is preferred to use from about 0.004 equivalent of base to about 0.007 equivalent of base per thousand parts of polyester resin formed.

The amount of component (b) that can be employed generally ranges from about 0.3 to about 5.0 parts per thousand of polyester resin formed. Again, it is generally preferred to employ from about 0.5 to about 2.0 parts per thousand.

The nature of the reaction giving rise to particle formation is not clearly understood but it is believed that, in the absence of the stabilizing compositions and under the reaction conditions employed in prior art processes, the metallic salt of isethionic acid is converted to sodium vinyl sulfonate, poly(vinylsulfonate) or a product of some reaction initiated by the sodium vinyl sulfonate. It is therefore important that components (a) and (b) be added shortly before or at the same time as the metallic salt of isethionic acid.

The sequence of addition of components (a) and (b) which comprise the stabilizing composition for the metallic salt of isethionic acid is not critical. It was found that the addition of component (a) could precede the addition of component (b) or that the addition of component (b) could precede that of component (a). Excellent results could be accomplished by either sequence of addition.

The mode of addition of components (a) and (b) is not critical. The components can be added either as solids or solutions. However, in practice it is preferred to introduce component (a) to the reaction mixture as a solution. It has been found that the particular glycol employed in the polyester forming process functions as an ideal solvent.

The invention is also illustrated particularly with respect to the use of sodium isethionate, the sodium salt of isethionic acid, to impart suitable cationic dyeability to the polyester resins. Other useful metallic salts of isethionic acid include those corresponding to the general formula $HOCH_2CH_2SO_3M$, where M is selected from the group consisting of alkali and alkaline earth metals. Of this group of metals representing M the alkali metals are preferred, with sodium being the most preferred metal. Representative examples of other metal salts of isethionic acid include lithium isethionate, sodium isethionate, potassium isethionate, magnesium isethionate, calcium isethionate and the like.

Ordinarily small amounts of the metal salts of isethionic acid will be employed. From 0.5 to 5 mol percent based on the mols of polyester resin formed can be used. Generally from about 1.5 to about 4 mol percent will be used.

The esterification step, step (A), of the process is carried out at elevated temperatures and atmospheric or superatmospheric pressures. The temperatures employed may range from 150° to 300° C. and preferably will range from 220° to 260° C. The pressure employed may range from atmospheric to superatmospheric. Generally, however, the pressures employed will range from atmospheric to about 30 or 40 pounds per square inch gauge pressure. No catalyst is necessary in the esterification reaction step. As noted above, the esterification step may be carried out in a solvent consisting of a low molecular weight linear polyester or copolyester resin having an average degree of polymerization of from 3 to 20.

The condensation or polymerization reaction step (B) of the above described process is carried out at elevated temperature under reduced pressure in the presence of a suitable condensation or polymerization catalyst in accordance with the usual known techniques. Thus the reaction is preferably carried out in the absence of oxygen, generally in an atmosphere of inert gas such as nitrogen or the like. It is carried out under reduced pressure, generally below 10 millimeters of mercury pressure at a temperature in the range of from 260° to 290° C., although other pressures and temperatures can be used, according to known practice. Representative examples of suitable condensation or polymerization reaction catalysts include such materials as antimony trioxide, zinc borate, litharge, lead acetate, magnesium oxide or other condensation reaction catalyst.

The invention provides an efficient means for preparing high molecular weight linear polyester and copolyester resins, i.e., resins having an intrinsic viscosity of at least 0.40 and generally ranging from about 0.5 to 0.8. Thus the practice of the present invention allows for the attainment of cationic dyeable high molecular weight linear polyester and copolyester resins free from the pigmented particle contamination noted above. The present invention can be operated either as a batch or as a continuous process.

The polymers formed in accordance with the teachings of this invention are considered to be sulfonate terminated polymers. That is, the chain ends of the polymers formed are terminated by the isethionate group. Thus, if desired, small amounts of a chain branching agent can be incorporated in the polyester to provide more chain end sites in order to incorporate a higher concentration of the isethionate group.

The polyester resins and the films and fibers produced from these polyester resins prepared in accordance with the teachings of this invention are susceptible to dyeing with "cationic dyes." The expression "cationic dyes" refers to colored organic materials which contain such groups as sulphonium, oxonium or quaternary ammonium. Polyester resins and films and fibers produced from polyester resins of this invention are capable of being uniformly dyed by such cationic dyes. Generally these cationic dyes are employed in a hot aqueous solution and the techniques for applying these cationic dyes are well known.

Representative examples of cationic dyes useful in this invention include Basic Yellow 13, Basic Red 18, Basic Blue 77, Basic Red 13, Basic Blue 87, Basic Orange 21, Basic Yellow 53, and Basic Red 14. Various other cationic (or basic) dyes suitable in dyeing the polyesters and copolyesters prepared in accordance with the invention are set forth in Colour Index, 3rd Ed. (1971) published by The Society of Dyers and Colourists (Great Britain).

While certain representative embodiments and details have been shown for the purpose of illustrating the invention it will be apparent to those skilled in this art that various changes and modifications may be made therein without departing from the spirit or scope of the invention.

What we claim is:

1. A process for preparing cationic dyeable high molecular weight linear polyester and copolyester resins consisting of the steps of
    (A) forming a reaction mixture consisting of
        (1) at least one free dicarboxylic acid,
        (2) at least one glycol,
        (3) a stabilizing composition consisting essentially of
            (a) at least one compound selected from the group consisting of alkali metal compounds and tertiary amines, and
            (a) at least one compound selected from the group consisting of hindered phenols and
        (4) a metallic salt of isethionic acid corresponding to the formula $HOCH_2CH_2SO_3M$ where M is selected from the group consisting of alkali metals and alkaline earth metals, and
    reacting the mixture to temperatures ranging from 150° to about 300° C. and pressures ranging from atmospheric to superatmospheric pressure to form an esterification product, and
    (B) polycondensing the esterification product of step (A) at temperatures ranging from about 260° C. to about 290° C. and pressures of 10 millimeters of mercury pressure or less.

2. The process of claim 1 wherein the alkali metal compounds are selected from the group consisting of alkali metal hydroxides, alkoxides, carboxylates and phosphates and wherein the tertiary amines correspond to the general formula $R_1R_2R_3N$, where $R_1$, $R_2$ and $R_3$ are selected from the group consisting of alkyl, hydroxyalkyl, cycloalkyl and aryl radicals.

3. The process of claim 1 wherein the hindered phenols are thermally stable at temperatures up to 300° C. and nonvolatile at pressures of 1.0 millimeter of mercury pressure and below.

4. A process according to claim 1 wherein the free dicarboxylic acid is selected from the group consisting of aromatic, aliphatic and cycloaliphatic dicarboxylic acids and the glycol is selected from the group consisting of polymethylene glycols containing from 2 to 10 methylene groups.

5. A process according to claim 4 wherein the free dicarboxylic acid is terephthalic acid and the glycol is ethylene glycol.

6. A process according to claim 1 wherein the metallic salt of isethionic acid is an alkali metal salt of isethionic acid.

7. A process according to claim 6 wherein the alkali metal salt of isethionic acid is sodium isethionate.

8. A process according to claim 1 wherein the esterification reaction, step (A), is carried out in the presence of a solvent consisting of a low molecular weight linear polyester or copolyester resin having an average degree of polymerization of from 3 to 20.

References Cited
UNITED STATES PATENTS

| | | | |
|---|---|---|---|
| 3,018,272 | 1/1962 | Griffing | 260—75 S |
| 3,583,941 | 6/1971 | Trapasso et al. | 260—513 R |
| 3,505,294 | 4/1970 | Ishii | 260—45.7 P |
| 3,567,799 | 3/1971 | Prevorsek | 260—45.7 P |
| 3,636,131 | 1/1972 | Davis et al. | 260—75 S |
| 3,651,014 | 3/1972 | Witsiepe | 260—75 R |

MAURICE J. WELSH, Primary Examiner

U.S. Cl. X.R.

260—45.7 P, 75 S